(12) United States Patent
Kobayashi et al.

(10) Patent No.: US 8,714,590 B2
(45) Date of Patent: May 6, 2014

(54) GAS GENERATOR FOR RESTRAINING DEVICE

(75) Inventors: Tomoharu Kobayashi, Hyogo (JP); Kenji Numoto, Hyogo (JP)

(73) Assignee: Daicel Corporation, Osaka (JP)

(*) Notice: Subject to any disclaimer, the term of this patent is extended or adjusted under 35 U.S.C. 154(b) by 0 days.

(21) Appl. No.: 13/618,205

(22) Filed: Sep. 14, 2012

(65) Prior Publication Data

US 2013/0098259 A1 Apr. 25, 2013

Related U.S. Application Data

(60) Provisional application No. 61/552,918, filed on Oct. 28, 2011.

(30) Foreign Application Priority Data

Oct. 24, 2011 (JP) ................................. 2011-232653

(51) Int. Cl.
*B60R 21/26* (2011.01)
*B60R 21/264* (2006.01)

(52) U.S. Cl.
CPC ..... *B60R 21/2644* (2013.01); *B60R 2021/2648* (2013.01); *B60R 2012/26076* (2013.01)
USPC .............................. 280/741; 280/736; 102/530

(58) Field of Classification Search
CPC .............. B60R 21/264; B60R 21/2644; B60R 21/2646; B60R 21/272; B60R 21/274; B60R 2021/26076; B60R 2021/26094; B60R 2012/2644; B60R 2021/2648
USPC ................................... 280/736, 741; 102/530
See application file for complete search history.

(56) References Cited

U.S. PATENT DOCUMENTS 5,951,040 A * 9/1999 McFarland et al. ........... 280/736
6,068,294 A * 5/2000 Jordan .......................... 280/741
(Continued)

FOREIGN PATENT DOCUMENTS

DE   199 23 931 A1   12/1999
EP   0 926 015 A2   6/1999
(Continued)

OTHER PUBLICATIONS

International Search Report and Written Opinion of the International Searching Authority issued in PCT/JP2012/074310 on Dec. 7, 2012.

*Primary Examiner* — Joseph M Rocca
*Assistant Examiner* — Timothy Wilhelm
(74) *Attorney, Agent, or Firm* — Birch, Stewart, Kolasch & Birch, LLP

(57) ABSTRACT

A gas generator for a restraining device includes:
a housing formed by a diffuser shell having a gas discharge port and a closure shell,
an ignition device chamber in which an ignition device is accommodated, and a combustion chamber in which a gas generating agent is accommodated, being defined inside the housing,
the ignition device chamber being defined inside an inner tube disposed in the housing, and the combustion chamber being defined outside the inner tube,
the inner tube including,
openings on both ends being fixed to a bottom surface and a top surface of the housing,
a flame-transferring hole being formed in a circumferential wall portion to communicate the ignition device chamber with the combustion chamber, and
a reduced strength portion being provided in the circumferential wall portion between the flame-transferring hole and the top surface of the housing.

8 Claims, 5 Drawing Sheets

(56) References Cited

U.S. PATENT DOCUMENTS

| | | | |
|---|---|---|---|
| 6,227,565 B1 * | 5/2001 | McFarland et al. | 280/736 |
| 7,806,435 B2 * | 10/2010 | Yamazaki | 280/741 |
| 8,276,521 B2 * | 10/2012 | Reichelt et al. | 102/530 |
| 2005/0151357 A1 | 7/2005 | Yamazaki | |

FOREIGN PATENT DOCUMENTS

| | | |
|---|---|---|
| FR | 2 863 985 A1 | 6/2005 |
| WO | WO 94/25315 A1 | 11/1994 |

* cited by examiner (a)

(b)

(a)

(b)

(a)

(b)

GAS GENERATOR FOR RESTRAINING DEVICE

This nonprovisional application claims priority under 35 U.S.C. §119(a) to Japanese Patent Application No. 2011-232653 filed on 24 Oct. 2011, and 35 U.S.C. §119(e) to U.S. Provisional Application No. 61/552,918 filed on 28 Oct. 2011, both of which are incorporated by reference.

BACKGROUND OF INVENTION

1. Field of Invention

The present invention relates to a gas generator for a restraining device such as an airbag apparatus installed on a vehicle.

2. Description of Related Art

Among gas generators used in airbag apparatuses installed on vehicles, in a pyrotechnic gas generator, a gas generating agent serving as a gas generation source is accommodated inside a housing which corresponds to an outer container.

When the gas generating agent burns and high-temperature gas is generated during actuation, the gas is ejected out of a gas discharge port formed in the housing, and the airbag is inflated and deployed. In this process, the housing is strong enough to withstand the increased internal pressure.

However, for some reason, the gas generator may burn abnormally and an excess pressure that exceeds the designed strength may be applied to the housing. Even if the housing is broken as the result thereof, such an abnormal situation that the occupant is injured by the fractured housing has to be avoided.

WO-A No. 94/25315 discloses dealing with such an abnormal situation.

In the gas generator shown in FIG. 1 of WO-A No. 94/25315, an igniter 18 is accommodated inside an igniter support tube 30 disposed inside a housing 12.

The tube 30 is fixed to both end surfaces (bottom surface and top surface) of the housing 12, and a plurality of apertures (flame-transferring holes) 40 are formed on the wall 34 side. In FIG. 1, a total of 13 apertures 40 are shown, and therefore it can be found that at least 26 apertures are formed along the entire circumference of the tube 30.

FIG. 2 of WO-A 94/25315 shows a state after the gas generator shown in FIG. 1 has been actuated (state in which an excess pressure caused by abnormal combustion has been applied). The housing 12 undergoes expansion and deformation such as to protrude toward a wall 34, and the tube 30 is broken in the portion where the apertures 40 are formed.

The portion of the tube 30 where the apertures 40 are formed thus serves as a reduced strength portion, and consequently, when an excess pressure is applied inside the housing 12, the tube 30 is broken, the inner volume is increased, and the internal pressure is then decreased, thereby preventing the housing 12 from fracturing.

The housing strength is increased by the wall 34 concaved inwardly. The joining surface area of a flare portion 31 of the tube 30 is made larger.

SUMMARY OF INVENTION

The present invention provides Invention 1 of a gas generator for a restraining device, including:
a housing formed by a diffuser shell having a gas discharge port and a closure shell,
an ignition device chamber in which an ignition device is accommodated, and a combustion chamber in which a gas generating agent is accommodated, being defined inside the housing,
the ignition device chamber being defined inside an inner tube disposed in the housing, and the combustion chamber being defined outside the inner tube,
the inner tube including,
openings on both ends being fixed to a bottom surface and a top surface of the housing,
a flame-transferring hole being formed in a circumferential wall portion to communicate the ignition device chamber with the combustion chamber, and
a reduced strength portion being provided in the circumferential wall portion between the flame-transferring hole and the top surface of the housing.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
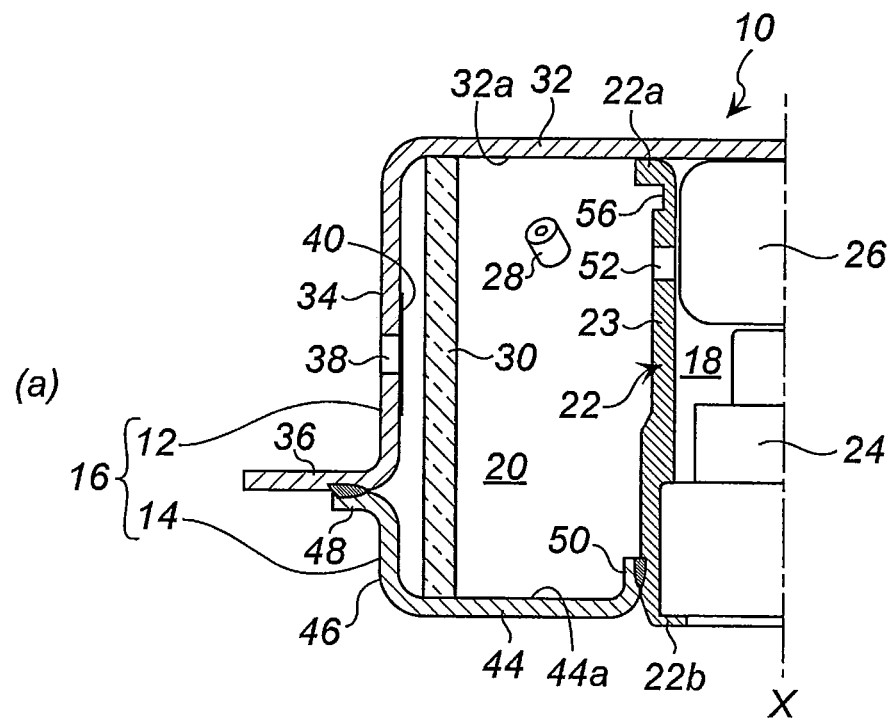
FIG. 1 shows, in (*a*), an axial sectional view (only half side) of the gas generator in accordance with the present invention that illustrates the state before the actuation, and, in (*b*), the state in which abnormal combustion has occurred and an excess pressure has been generated in the gas generator shown in FIG. 1(*a*).
Figure 1:
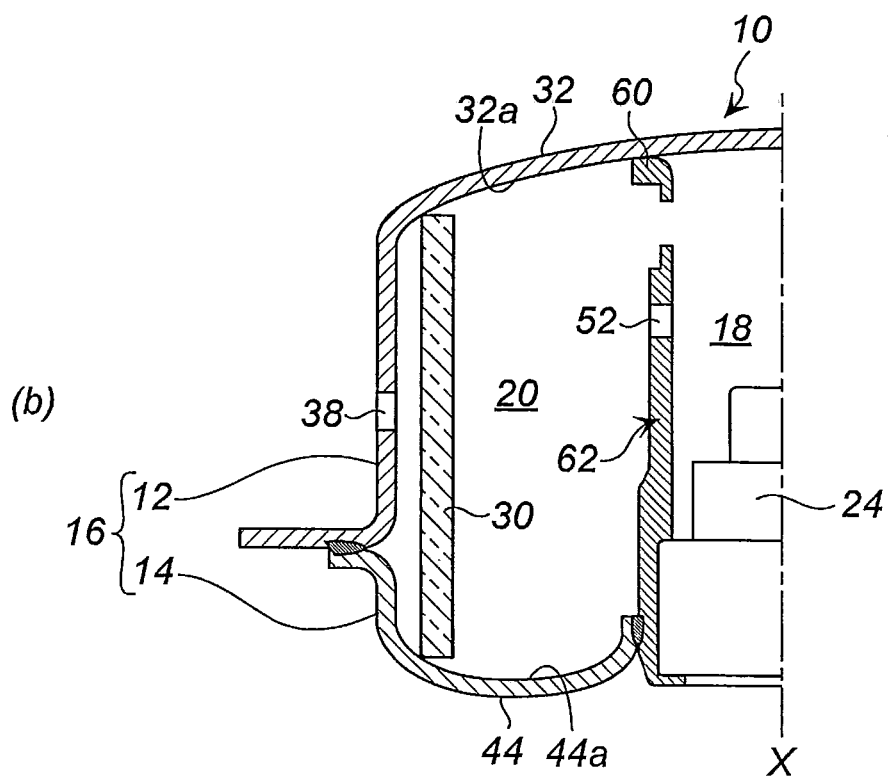

In WO-A No. 94/25315, a band-like portion extending circumferentially, in which the apertures 40 are formed, corresponds to the reduced strength portion. Therefore, a large number of apertures 40, such as described above, have to be made.

In this case, since a large number of apertures 40 are formed with a small spacing, the drilling or punching operation is difficult, the tube 30 itself needs to be increased in thickness to maintain the strength of the band-like portion in which the apertures 40 are formed, and therefore, the weight of the gas generator is increased.

Further, since the apertures 40 serve to ignite and burn a propellant 14 by ejecting out the flame generated when the igniter 18 is actuated, taking into account the ability to ignite the entire propellant 14, it is preferred that the height position of the apertures are not too close to the wall 34. In particular in WO-A No. 94/25315, the apertures 40 and the gas discharge port 24 are on the wall 34 side. When the apertures 40 are too close to the wall 34, the ability to ignite the propellant 14 located on the opposite side to the wall 34 in the combustion chamber is lowered.

However, in order to reduce as much as possible the length of the tube 30 that remains fixed to the wall 34 in actuation (in the state shown in FIG. 2), it is necessary that the portion where the apertures 40 are formed be positioned close to the wall 34. Consequently, since the propellant 14 is ignited from one side and the combustion advances to the other side, problems in terms of ignition ability occur.

The present invention provides a gas generator for a restraining device that can respond successfully even to abnormal combustion, if such occurs, while maintaining high ignition ability of the gas generating agent inside the combustion chamber during normal actuation.

The present invention provides preferable embodiments 2 to 8 of Invention 1 as follows:

Embodiment 2

The gas generator for a restraining device according to Invention 1, wherein the inner tube has the reduced strength portion in the circumferential wall portion of the top surface side, at a height greater than 80% of a height from the bottom surface to the top surface of the housing.

Embodiment 3

The gas generator for a restraining device according to Invention 1, wherein the inner tube is provided with four to eight flame-transferring holes per one row in a circumferential direction, for communicating the ignition device chamber with the combustion chamber, the flame-transferring holes in one row or in two or more rows at different height positions in the circumferential wall portion of the top surface side, at a height greater than 50% of a height from the bottom surface to the top surface of the housing; and the reduced strength portion in the circumferential wall portion of the top surface side, at a height greater than 80% of the height from the bottom surface to the top surface of the housing.

Embodiment 4

The gas generator for a restraining device according to any one of Invention 1 and Embodiments 2 and 3, wherein the reduced strength portion formed in the circumferential wall portion of the inner tube is thinner than the other circumferential wall portion where the reduced strength portion is not formed, and is thinner in the circumferential wall portion of the inner tube only on a side of the combustion chamber.

Embodiment 5

The gas generator for a restraining device according to any one of Invention 1 and Embodiments 2 and 3, wherein the reduced strength portion formed in the circumferential wall portion of the inner tube is thinner than the other circumferential wall portion where the reduced strength portion is not formed, and is thinner in the circumferential wall portion of the inner tube only on a side of the ignition device chamber side.

Embodiment 6

The gas generator for a restraining device according to any one of Invention 1 and Embodiments 2 and 3, wherein the reduced strength portion formed in the circumferential wall portion of the inner tube is thinner than the other circumferential wall portion where the reduced strength portion is not formed, and is thinner in the circumferential wall portion of the inner tube on both sides of the combustion chamber and the ignition device chamber.

Embodiment 7

The gas generator for a restraining device according to any one of Invention 1 and Embodiments 2 and 3, wherein the inner tube has a plurality of depressions and protrusions formed axially and arranged alternately in the circumferential direction on an edge of an opening at one end, the top surface of the housing has a columnar protrusion protruding inward, and the opening of the inner tube having the depressions and protrusions is fitted onto the columnar protrusion of the top surface of the housing, and the depressions of the inner tube are closed by an outer circumferential surface of the columnar protrusion.

Embodiment 8

The gas generator for a restraining device according to any one of Invention 1 and Embodiments 2 and 3, wherein the inner tube has a plurality of depressions and protrusions formed axially and arranged alternately in the circumferential direction on an edge of an opening at one end;

the top surface of the housing has a columnar protrusion protruding outward; and the opening of the inner tube having the depressions and protrusions is fitted into the columnar protrusion of the top surface of the housing, and the depressions of the inner tube are closed by an inner circumferential surface of the columnar protrusion.

When the gas generator is incorporated in an airbag device, the airbag is disposed in the side of the diffuser shell having the gas discharge port, and inflated by the gas discharged out of the gas discharge port.

Therefore, in the gas generator in accordance with the present invention, the diffuser shell side having the gas discharge port is the top surface, and the closure shell side directly opposite to the top surface is a bottom surface. And the top surface side is the occupant side.

In the gas generator in accordance with the present invention, a reduced strength portion is formed in a part of the circumferential wall portion, between the flame-transferring hole of the inner tube that forms the ignition device chamber and the top surface of the housing.

In the event of abnormal combustion, the inner tube is broken at the reduced strength portion and the inner volume of the housing is increased, so that the housing is prevented from being broken.

When the inner tube is broken, it is broken at a position close to the top surface of the housing. Accordingly, only a very small piece of the inner tube remains fixed to the top surface of the housing. If the remaining piece of the inner tube that remains on the top surface of the housing is large, when the top surface of the housing is deformed, an additional load is applied to the top surface by the remaining piece of the inner tube, and the top surface can be fractured. However, in accordance with the present invention, the top surface of the housing is prevented from being fractured.

The reduced strength portion can sufficiently withstand the pressure when the gas generator operates normally, but is fractured (broken or cleaved) by the excess pressure during abnormal combustion.

In the abnormal combustion, the gas generating agent located inside the combustion chamber or the transfer charge of the ignition device chamber undergoes abnormal combustion, and the reduced strength portion is fractured by the excess pressure.

Since the number of the flame-transferring holes for communicating the ignition device chamber with the combustion chamber is as small as four to ten, the drilling or punching operation is facilitated and the strength of the circumferential wall portion of the inner tube where the flame-transferring holes are formed can be maintained.

Furthermore, since the flame-transferring holes are formed closer to the center in the height direction than the reduced strength portion, the ignition ability of the gas generating agent in the combustion chamber does not deteriorate.

In the gas generator in accordance with the present invention, the position of the reduced strength portion is at the circumferential wall portion between the flame-transferring holes and the top surface of the housing, but preferably at the circumferential wall portion of the top surface side, at a height greater than 80% of a height from the bottom surface to the top surface of the housing.

In the gas generator in accordance with the present invention, four to eight flame-transferring holes per one row are formed in a circumferential direction (in one row or in two or more rows at different height positions), for communicating the ignition device chamber with the combustion chamber, in the circumferential wall portion on the top surface side, at a height greater than 50% of a height from the bottom surface to the top surface of the housing. And the reduced strength portion is formed in the circumferential wall portion of the top surface side, at a height greater than 80% of the height from the bottom surface to the top surface of the housing.

The reduced strength portion is fractured preferentially when an excess pressure caused by abnormal combustion is applied. The reduced strength portion may be one of the followings:

(I) The reduced strength portion is formed thinner than the other circumferential wall portion where the reduced strength portion is not formed, and is thinner in the circumferential wall portion of the inner tube only on the combustion chamber side;

(II) The reduced strength portion is formed thinner than the other circumferential wall portion where the reduced strength portion is not formed, and is thinner in the circumferential wall portion of the inner tube only on the ignition device chamber side;

(III) The reduced strength portion is formed thinner than the other circumferential wall portion where the reduced strength portion is not formed, and is thinner in the circumferential wall portion of the inner tube on both of the combustion chamber side and the ignition device chamber side.

(IV) A welded portion is provided with a lowered welding strength caused by a reduced contact surface area between the top surface of the housing and any one of the reduced strength portions (I) to (III) which are formed thinner as described above.

For example, machining can be used as a method for reducing the thickness of the circumferential wall portion.

In the gas generator in accordance with the present invention, the reduced strength portion can be formed by a combination of a shape of the inner tube and a structure of the top surface of the housing.

In one such possible combination, the inner tube has a plurality of depressions and protrusions formed axially and arranged alternately in the circumferential direction on an edge of an opening at one end;

the top surface of the housing has a columnar protrusion protruding inward; and the opening of the inner tube having the depressions and protrusions is fitted onto the columnar protrusion of the top surface of the housing, and the depressions of the inner tube are closed by an outer circumferential surface of the columnar protrusion.

In the gas generator having such a structure, the protrusions of the inner tube are fixed by welding to the top surface of the housing, but the depressions of the inner tube are not in contact with the top surface of the housing. As a result, the contact surface area is small and therefore this portion is a reduced strength portion.

During normal actuation of the gas generator of such a structure, flame generated in the ignition device chamber is discharged only from the flame-transferring holes.

In the event of abnormal actuation, the protrusions of the inner tube are separated from the top surface of the housing, and a gap is generated between the depressions and the columnar protrusion, thereby increasing the internal volume.

In another such possible combination, the inner tube has a plurality of depressions and protrusions formed axially and arranged alternately in the circumferential direction on an edge of an opening at one end;

the top surface of the housing has a columnar protrusion protruding outward; and the opening of the inner tube having the depressions and protrusions is fitted into the columnar protrusion of the top surface of the housing, and the depressions of the inner tube are closed by an inner circumferential surface of the columnar protrusion.

In the gas generator of such a structure, the protrusions of the inner tune are fixed by welding to the top surface of the housing, but the depressions of the inner tube are not in contact with the top surface of the housing. As a result, the contact surface area is small and therefore this portion is a reduced strength portion.

During normal actuation of the gas generator having such a structure, flame generated in the ignition device chamber is discharged only from the flame-transferring holes.

In the event of abnormal actuation, the protrusions of the inner tube are separated from the top surface of the housing, and a gap is generated between the depressions and the columnar protrusion, thereby increasing the internal volume.

In the gas generator in accordance with the present invention, the housing is prevented from fracture when abnormal combustion occurs and excess pressure is generated inside the housing.

Embodiments of Invention (1) Gas Generator Shown in FIG. 1

In a gas generator 10 shown in FIG. 1(*a*), a housing 16 is formed by a diffuser shell 12 and a closure shell 14.

An outer diameter and an axial height of the housing 16 are preferably applied such that the ratio of outer diameter/height is within the range of 0.8 to 3, in order to obtain an advantageous effect of the present invention.

An inner tube 22, that defines an ignition device chamber 18 and a combustion chamber 20, is disposed inside the housing 16.

An igniter 24 and a transfer charge 26 are disposed inside the ignition device chamber 18. A gas generating agent 28 and a tubular filter 30 are disposed in the combustion chamber 20. As the transfer charge 26, known black powder and a gas generating agent can be used.

The diffuser shell 12 is formed by press-molding a sheet of stainless steel or iron. The diffuser shell has a round top plate 32, a circumferential wall 34 formed on the outer edge of the top plate 32, and a flange 36 extending radially outward from the lower end of the circumferential wall 34. The inner side surface of the top plate 32 is a top surface 32a.

A gas discharge port 38 is provided in the circumferential wall 34 and closed by a seal tape 40 from the inner side of the housing 16.

The closure shell 14 is formed by press-molding a sheet of stainless steel or iron. The closure shell has a round bottom plate 44 having a hole formed in the center thereof, a circumferential wall 46 formed on the outer edge of the bottom plate 44, and a flange 48 extending radially outward from the upper end of the circumferential wall 46. The inner side surface of the bottom plate 44 is a bottom surface 44a.

In the hole in the center of the bottom plate 44, a bent portion 50 is formed by being bent toward the inside of the housing 16.

The flange 48 is overlaid on and welded to the flange 36 of the diffuser shell 12.

The inner tube 22 is arranged coaxially with the center axis X of the housing 16.

One end portion (upper end) of the circumferential wall portion 23 of the inner tube 22 is a flange 22a that expands outward, and the flange 22a is attached by welding to the inner side of the top plate 32 of the diffuser shell 12. In the present embodiment, the flange 22a is fixed by welding to the top plate 32 and therefore is not included in the circumferential wall portion 23.

The opposite end portion (lower end) of the circumferential wall portion 23 of the inner tube 22 is fitted into the hole of the closure shell 14 and the portion thereof that abuts on the inner circumferential surface of the bent portion 50 is fixed thereto by welding.

A plurality of flame-transferring holes 52, that communicate the combustion chamber 20 with the ignition device chamber 18, is formed in the circumferential wall portion 23 of the inner tube 22 and sealed from the outside (on combustion chamber 20 side) with a seal tape (not shown in the drawing).

The flame-transferring holes 52 are formed such that a single row includes 4 to 10 holes, preferably such that a single row includes 4 to 8 holes arranged circumferentially with equal intervals. Where the number of flame-transferring holes 52 is within the aforementioned range, the strength of the circumferential wall portion 23 of the inner tube 22 where the flame-transferring holes 52 are formed can be maintained at a high level.

In FIG. 1, the flame-transferring holes 52 are formed in a single row, but they can be also formed in two or more rows arranged at different height positions.

The inner diameter (opening diameter) of the flame-transferring holes 52 is preferably 1 mm to 4 mm, more preferably 1.5 mm to 3 mm.

The flame-transferring holes 52 are formed in the circumferential wall portion 23 on the top plate 32 side at a height that is greater than 50% of the height from the bottom surface 44a to the top surface 32a, preferably within a height range from 60% to less than 80%, more preferably 60% to 70% of the aforementioned range.

A reduced strength portion 56 is formed in the circumferential wall portion 23 between the flame-transferring holes 52 and the top plate portion (top surface) 32. In FIG. 1, the reduced strength portion 56 is formed in the boundary portion of the circumferential wall portion 23 and the flange 22a.

The reduced strength portion is formed in the circumferential wall portion 23 on the top surface 32a side preferably within a height range over 80%, more preferably 85% to 95% of the height from the bottom surface 44a to the top surface 32a.

The reduced strength portion 56 is formed by grooves in which the thickness of the circumferential wall portion 23 on the combustion chamber (20) side is reduced.

The reduced strength portion 56 is formed by a single groove continuous in the circumferential direction, but may also be formed by a discontinuous groove or a plurality of grooves.

The reduced strength portion 56 is not cleaved during normal combustion of the gas generating agent 28 inside the combustion chamber 20, and cleaved only by an excess pressure caused by abnormal combustion. The excess pressure during abnormal combustion as referred to herein is realized, for example, when the internal pressure of the housing 16 is higher than the designed pressure by a factor of equal to or greater than 1.6.

The opposite end portion 22b of the inner tube 22 is reduced in thickness, and the igniter 24 is fixed by crimping this portion. The thinned crimping portion is designed to facilitate the crimping operation and does not act as the reduced strength portion 56.

The operation of the gas generator shown in FIG. 1(a) is described below.

When an impact or collision is detected by a sensor (not shown in the drawing), the igniter 24 is actuated. The transfer charge 26 is then ignited and high-temperature flame is generated. The flame is ejected out from the flame-transferring holes 52 and ignites the gas generating agent 28 in the combustion chamber 20.

The gas generating agent 28 burns and high-temperature and high-pressure gas is generated. The combustion gas passes through the filter 30, breaks the seal tape 40 in a cooled and filtered state and is discharged from the gas discharge port 38 to inflate the airbag (not shown in the drawing).

The housing 16 and the inner tube 22 are designed to be capable of sufficiently withstanding the generated pressure, and the welded portions (a joint of the flange 36 and the flange 48, a joint of the top plate 32 and the flange 22a of the inner tube 22, and a joint of the bent portion 50 and the other end portion of the inner tube 22) are obtained such as to withstand the generated pressure when the gas generator 10 is thus actuated normally.

The reduced strength portion 56 is also formed such as to withstand the inner pressure of the housing 16 generated in a normal way.

Therefore, in the case of such normal actuation, the housing 16 is not deformed excessively and the reduced strength portion 56 is not cleaved.

When the pressure inside the housing 16 abnormally rises for some reasons, the housing 16 is assumed to yield to the pressure and fracture.

FIG. 1(b) illustrates the state in which the internal pressure of the gas generator shown in FIG. 1(a) has risen to above the designed pressure and the inner tube 22 has been cleaved from the reduced strength portion 56.

Due to an excess pressure, the top plate 32 and the bottom plate 44 undergo significant expansion and deformation. In this case, the joint surface area of the top plate 32 and the flange 22a of the inner tube 22 is large and the joint surface area of the opposite end of the inner tube 22 with the bent portion 50 also is large. Therefore, the inner tube 22 is torn at the reduced strength portion 56, and a first piece 60 remains attached to the top plate 32.

Meanwhile, the inner tube 22 below the reduced strength portion 56 (on the bottom plate 44 side) remains as a second piece 62 at the bottom plate 44.

In a case where a large piece remains on the top plate 32 side when the top plate 32 and the bottom plate 44 are deformed, the deformation of the top plate 32 increases due to the inertia force and the fracture occurs at the portion with the remaining piece.

However, resulting from the fact that the inner tube 22 is torn at the reduced strength portion 56, a small first piece 60 remains on the top plate 32 side and therefore the top plate 32 is not fractured.

Since it is difficult to estimate the fragments into which the constituent parts of the gas generator 10 disintegrate when the housing 16 is fractured by the excess pressure, the influence thereof on the occupant is difficult to avoid.

In the gas generator in accordance with the present invention, the housing 16 is prevented from fracturing even when an excess pressure is generated. Therefore, even when an abnormal combustion occurs in the gas generator 10, the influence of the occupant can be avoided.

Figure 2:
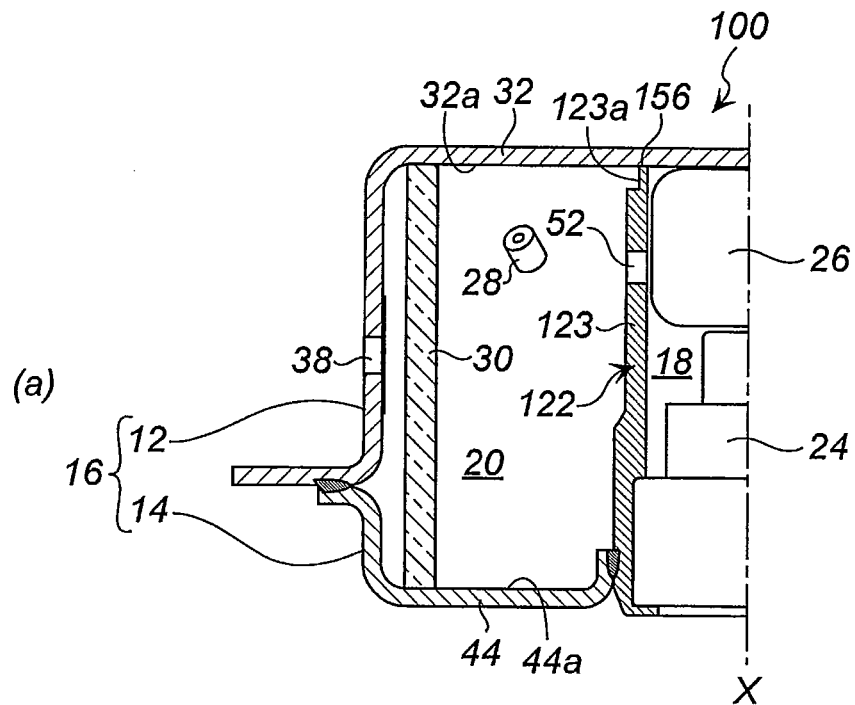
FIG. 2 shows, in (*a*), an axial sectional view (only half side) of the gas generator of another embodiment of the present invention that illustrates the state before the actuation, and, in (*b*), the state in which abnormal combustion has occurred and an excess pressure has been generated in the gas generator shown in FIG. 2(*a*).
Figure 2:
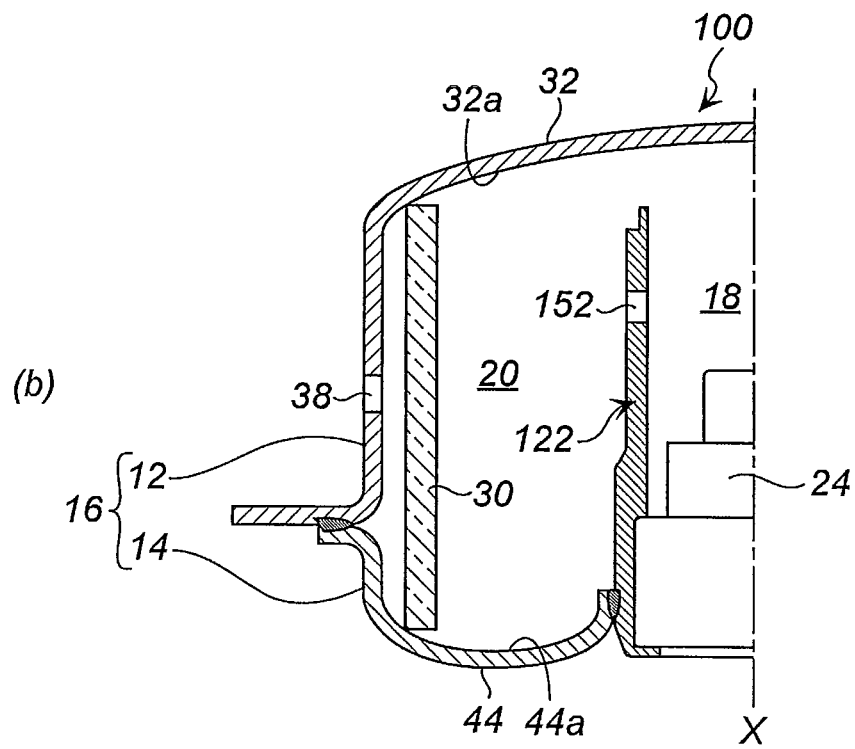

(2) Gas Generator Shown in FIG. 2

FIG. 2 is a cross-sectional view (half) of a gas generator 100 including another embodiment of the present invention. The components same as those shown in FIG. 1 are assigned with the same reference numerals, and only the different components are explained.

The reduced strength portion formed in the inner tube in the gas generator 100 shown in FIG. 2(a) is different from that shown in FIG. 1(a).

In the inner tube 122 shown in FIG. 2(a), the end surface (end surface of the circumferential wall portion) 123a of a circumferential wall portion 123 on the top plate 32 side is made thinner continuously in the circumferential direction in the side of the combustion chamber 20. In FIG. 2(a), the reduced thickness portion is formed to have a uniform thickness in the circumferential direction, but this portion can be also gradually tilted so that the smallest thickness is attained at the top plate 32 side.

The thin end surface 123a of the circumferential wall portion of the inner tube 122 is fixed by resistance-welding to the top plate 32 (top surface 32a).

In the gas generator 100 shown in FIG. 2(a), only the thin end surface 123a of the circumferential wall portion can be used as the reduced strength portion, or both the thin end surface 123a of the circumferential wall portion and the welded portion 156 can be used as the reduced strength portions.

FIG. 2(b) illustrates the state in which the internal pressure has risen abnormally due to abnormal combustion in the actuated gas generator 100 shown in FIG. 2(a).

Due to an excess pressure, the top plate 32 and the bottom plate 44 undergo expansion and deformation, a welded portion 156 of the inner tube 122 separates from the top plate 32, and part of the end surface 123a of the circumferential wall portion is broken. As a result, the inner tube 122 separates from the top plate 32 and the internal volume of the housing 16 is increased.

Therefore, practically end surface 123a of the circumferential wall portion 123 does not remain on the top plate 32. Meanwhile, a large portion of the inner tube 122 remains fixed to the bottom plate 44, the top plate 32 is only deformed, and the housing 16 is not fractured or broken.

Figure 3:
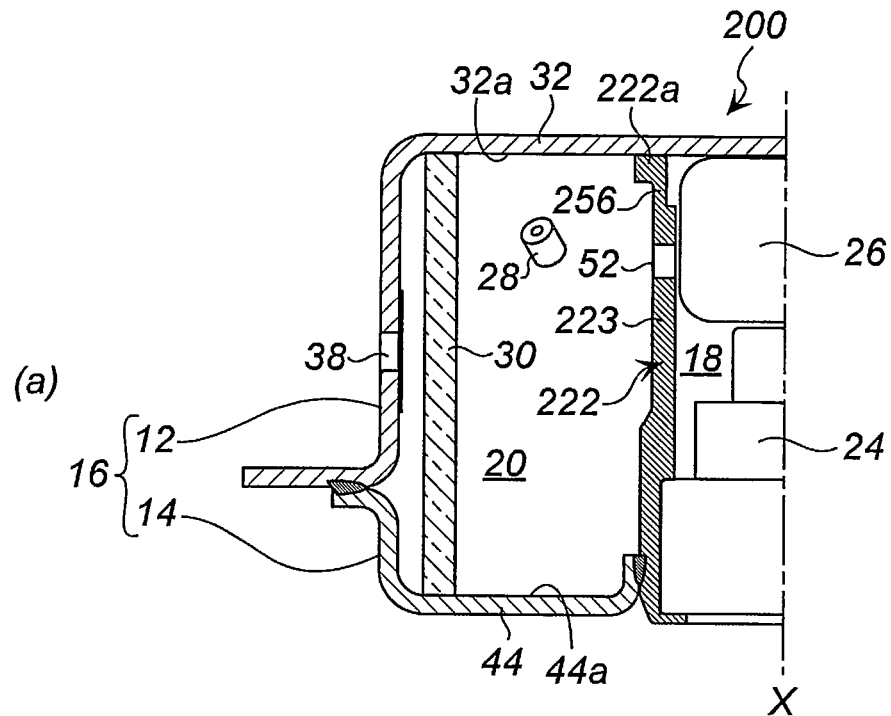
FIG. 3 shows, in (*a*), an axial sectional view (only half side) of the gas generator of another embodiment of the present invention that illustrates the state before the actuation, and, in (*b*), the state in which abnormal combustion has occurred and an excess pressure has been generated in the gas generator shown in FIG. 3(*a*).
Figure 3:
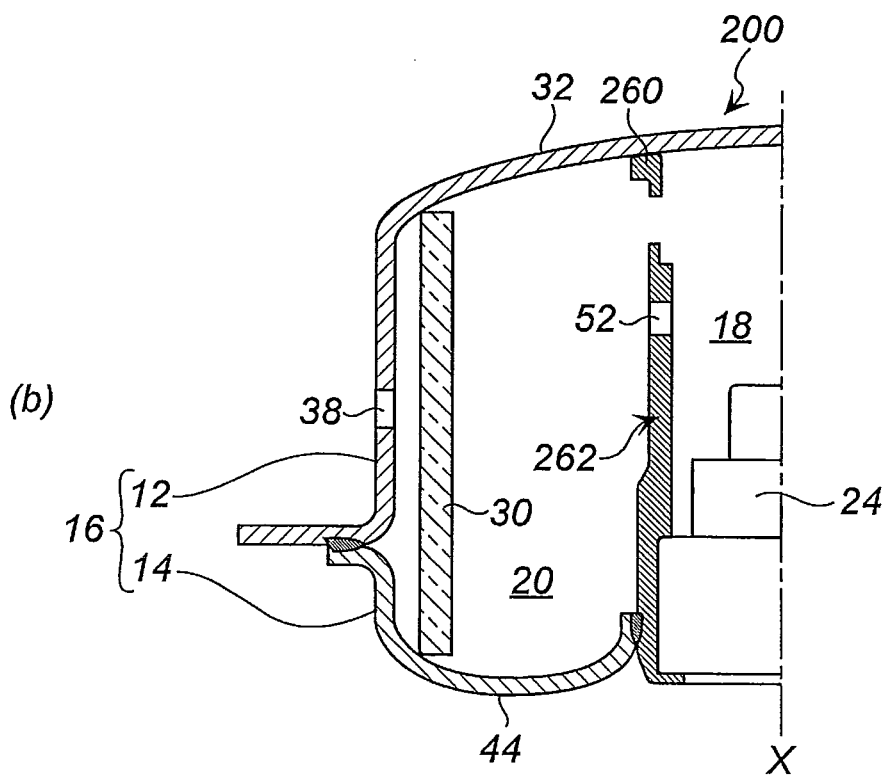

(3) Gas Generator Shown in FIG. 3

FIG. 3 is a cross-sectional view (half) of a gas generator 200 including another embodiment of the present invention. The components same as those shown in FIG. 1 are assigned with the same reference numerals, and only the different components are explained.

In an inner tube 222, one end portion (upper portion) of a circumferential wall portion 223 is formed as a flange portion 222a expanding outward, and the inner tube is fixed by welding to the top surface 32a of the top plate 32 of the diffuser shell 12 at this flange portion 222a.

The inner side (ignition device chamber 18 side) of the flange portion 222a of the circumferential wall portion 223 is reduced in thickness by machining continuously in the circumferential direction, and this reduced thickness portion is a reduced strength portion 256.

FIG. 3(b) illustrates the state in which the internal pressure has risen abnormally due to abnormal combustion in the actuated gas generator 200 shown in FIG. 3(a).

Due to an excess pressure, the top plate 32 and the bottom plate 44 undergo deformation, the inner tube 222 is torn at the reduced strength portion 256 and the internal volume of the housing 16 is increased.

A small part of the torn flange portion 222a remains attached to the tope plate 32 as a small first piece 260. Meanwhile, a large portion (second piece 262) of the inner tube 222 remains fixed to the bottom plate 44. Therefore, the top plate 32 is only deformed, without being fractured or cut.

Figure 4:
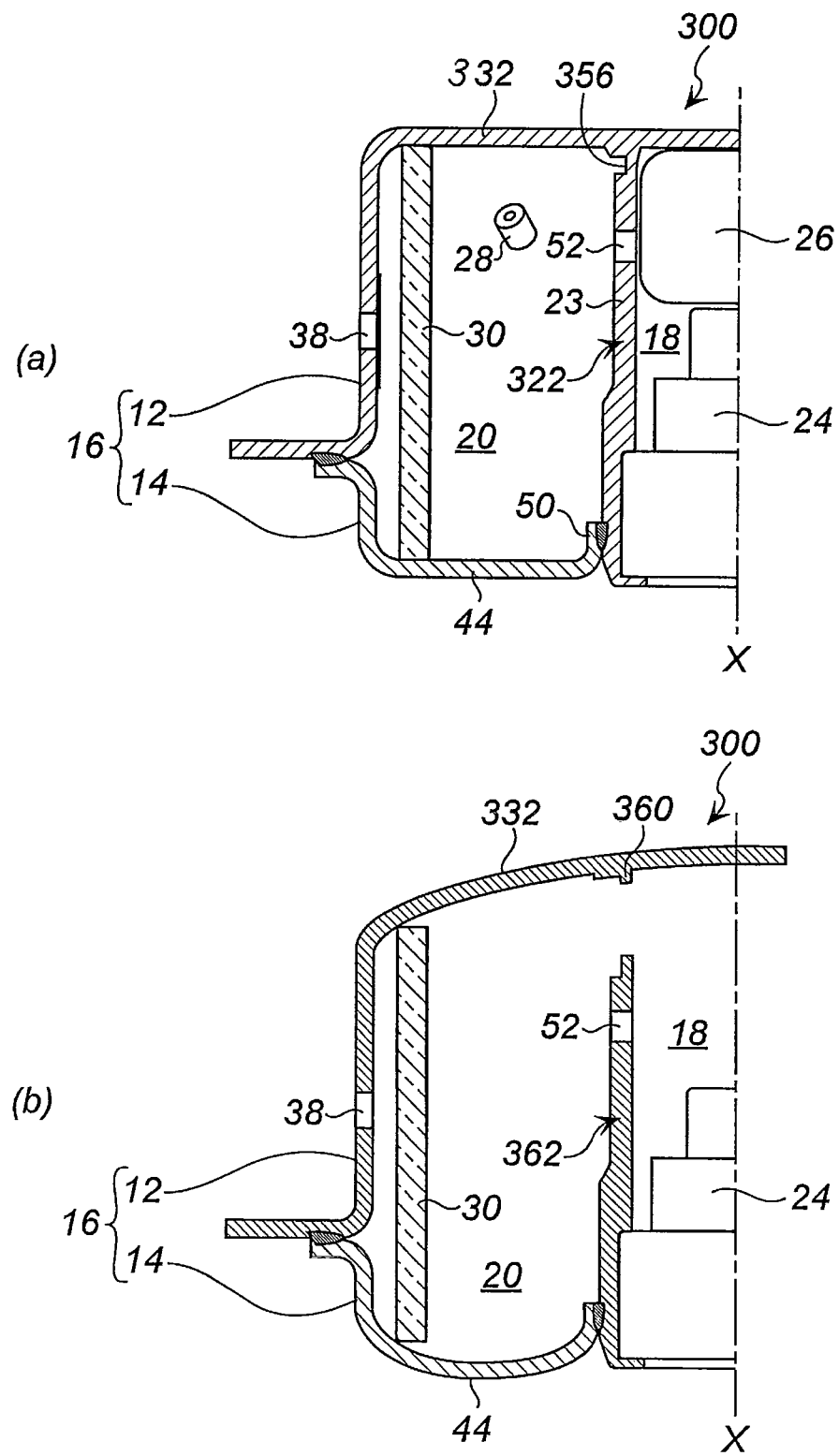
FIG. 4 shows, in (*a*), an axial sectional view (only half side) of the gas generator of another embodiment of the present invention that illustrates the state before the actuation and, in (*b*), the state in which abnormal combustion has occurred and an excess pressure has been generated in the gas generator shown in FIG. 4(*a*).

(4) Gas Generator Shown in FIG. 4

FIG. 4 is a cross-sectional view (half) of a gas generator 300 including another embodiment of the present invention. The components same as those shown in FIG. 1 are assigned with the same reference numerals, and only the different components are explained.

In the gas generator shown in FIG. 4, an inner tube 322 and the diffuser 12 are formed integrally by a known method such as forging.

The outer circumferential surface of the boundary portion of the inner tube 322 and the top plate 332 is machined continuously in the circumferential direction, and the reduced thickness portion is a reduced strength portion 356.

FIG. 4(b) illustrates the state in which the internal pressure has risen abnormally due to abnormal combustion in the actuated gas generator 300 shown in FIG. 4(a).

When an excess pressure is generated inside the housing 16, the top plate 332 and the bottom plate 44 are deformed by this pressure, the inner tube 322 is torn from the reduced strength portion 356 and the internal volume of the housing 16 is increased.

The torn flange portion remains as a small first piece 360. Meanwhile, a large portion (second piece 362) of the inner tube 322 remains fixed to the bottom plate 44. Therefore, the top plate 332 is only deformed, without being fractured or broken.

Figure 5:
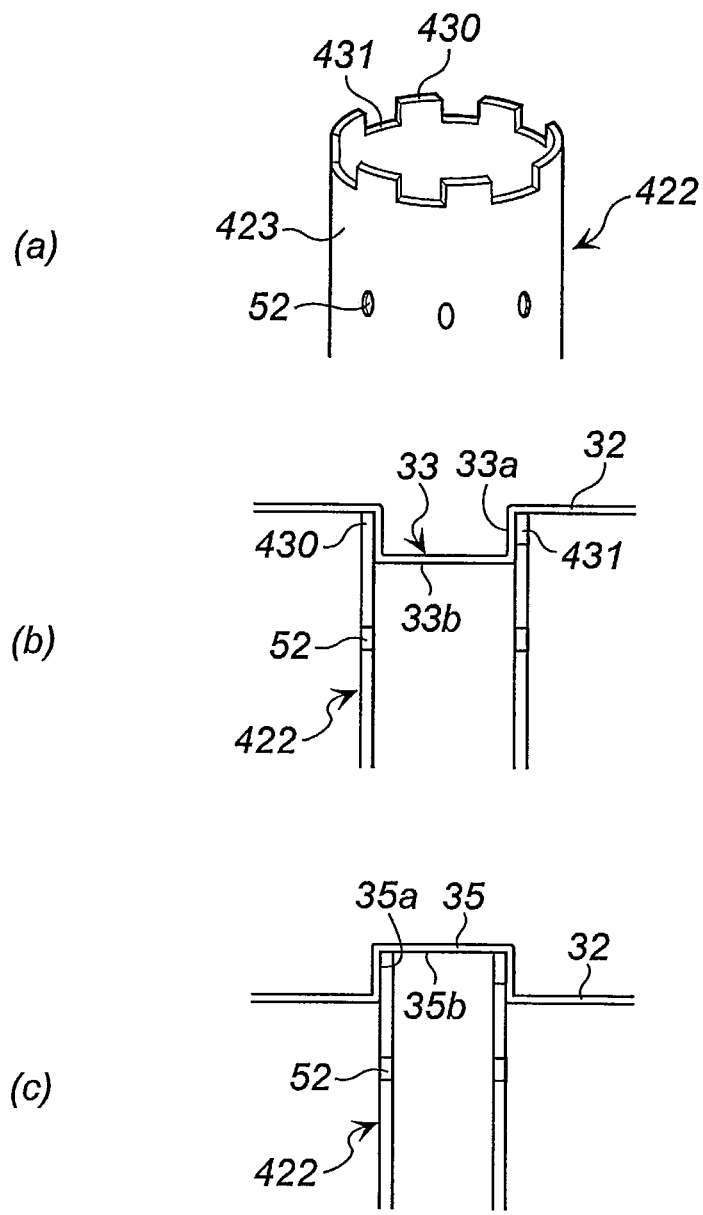
FIG. 5 shows, in (*a*), a perspective view of the inner tube used in the gas generator of another embodiment of the present invention, and, in (*b*) and (*c*), an axial partial sectional view illustrating another embodiment using the inner tube shown in FIG. 5(*a*).

(5) Gas Generator Shown in FIG. 5

FIG. 5(a) is a perspective view of an inner tube 422 of another embodiment that is used in the gas generator in accordance with the present invention.

In the inner tube 422, a plurality of protrusions and depressions is formed in the circumferential direction on an edge of one opening in the top plate side of the gas generator. The protrusions and depressions may also have a different shape, for example, a trapezoidal shape.

The plurality of protrusions and depressions is formed by a combination of protrusions 430 protruding axially from the circumferential edge of the one end opening of a circumferential wall portion 423 and depressions 431, and protrusions 430 and depressions 431 are arranged alternately in the circumferential direction.

FIG. 5(b) illustrates an embodiment in which the inner tube 422 shown in FIG. 5(a) is disposed inside the gas generator. The shape of the top plate 32 of the diffuser shell is modified correspondingly to the inner tube 422.

A columnar protrusion 33 protruding inward the housing is formed in the central portion of the top plate 32. The columnar protrusion 33 includes a circumferential wall 33a and a bottom surface 33b.

The inner tube 422 is disposed such that the protrusions 430 and depressions 431 abut against the outer side surface of the circumferential wall 33a of the columnar protrusion 33. Therefore, the depressions 431 are closed by the outer side surface of the circumferential wall 33a.

The abutting portions of the top plate 32 and the protrusions 430 of the inner tube 422 are welded together.

FIG. 5(c) illustrates an embodiment in which the inner tube 422 shown in FIG. 5(a) is disposed inside the gas generator. The shape of the top plate 32 of the diffuser shell is modified correspondingly to the inner tube 422.

A columnar protrusion 35 protruding outward the housing is formed in the central portion of the top plate 32. The columnar protrusion 35 includes a circumferential wall 35a and a bottom surface 35b.

The inner tube 422 is disposed such that the protrusions 430 and depressions 431 abut against the inner circumferential surface of the circumferential wall 35a of the columnar protrusion. Therefore, the depressions 431 are closed by the inner circumferential surface of the circumferential wall 35a.

The abutting portions of the top plate 32 and the protrusions 430 of the inner tube 422 are welded together.

When an excess pressure is applied due to abnormal combustion inside the gas generator shown in FIGS. 5(b) and 5(c) at activation, the top plate 32 is expanded by being torn at the protrusions 430 of the inner tube 422, thereby increasing the inner volume.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator for a restraining device, comprising:
   a housing including a diffuser shell having a top plate and a gas discharge port, and a closure shell having a bottom plate and attached to the diffuser shell, an inner surface of the top plate being a top surface and an inner surface of the bottom plate being a bottom surface;
   an inner tube disposed in the housing, the inner tube defining therein an ignition device chamber in which an ignition device is accommodated, and defining outside thereof a combustion chamber in which a gas generating agent is accommodated, an opening on one end of the inner tube being fixed to the bottom surface and another end of the inner tube being directly fixed to or formed integrally with the top surface,
   the inner tube further including:
   a flame-transferring hole being formed in a circumferential wall portion to communicate the ignition device chamber with the combustion chamber, and
   a reduced strength portion being provided in the circumferential wall portion between the flame-transferring hole and the top surface, such that the reduced strength portion is cleaved only when an internal pressure of the housing is higher than a designed pressure.

2. The gas generator for a restraining device according to claim 1, wherein the inner tube has the reduced strength portion in the circumferential wall portion of the top surface side, at a height greater than 80% of a height from the bottom surface to the top surface of the housing.

3. The gas generator for a restraining device according to claim 1, wherein the inner tube is provided with four to eight flame-transferring holes per one row in a circumferential direction, for communicating the ignition device chamber with the combustion chamber, the flame-transferring holes in one row or in two or more rows at different height positions in the circumferential wall portion of the top surface side, at a height greater than 50% of a height from the bottom surface to the top surface of the housing; and
   the reduced strength portion in the circumferential wall portion of the top surface side, at a height greater than 80% of the height from the bottom surface to the top surface of the housing.

4. The gas generator for a restraining device according to claim 1, wherein
   the reduced strength portion formed in the circumferential wall portion of the inner tube is thinner than the other circumferential wall portion where the reduced strength portion is not formed, and is thinner in the circumferential wall portion of the inner tube only on a side of the combustion chamber.

5. The gas generator for a restraining device according to claim 1, wherein the reduced strength portion formed in the circumferential wall portion of the inner tube is thinner than the other circumferential wall portion where the reduced strength portion is not formed, and is thinner in the circumferential wall portion of the inner tube only on a side of the ignition device chamber.

6. The gas generator for a restraining device according to claim 1, wherein the reduced strength portion formed in the circumferential wall portion of the inner tube is thinner than the other circumferential wall portion where the reduced strength portion is not formed, and is thinner in the circumferential wall portion of the inner tube on both sides of the combustion chamber and the ignition device chamber.

7. The gas generator for a restraining device according to claim 1, wherein
   the inner tube has a plurality of depressions and protrusions formed axially and arranged alternately in the circumferential direction on an edge of an opening at one end,
   the top surface of the housing has a columnar protrusion protruding inward, and
   the opening of the inner tube having the depressions and protrusions is fitted onto the columnar protrusion of the top surface of the housing, and the depressions of the inner tube are closed by an outer circumferential surface of the columnar protrusion.

8. The gas generator for a restraining device according to claim 1, wherein
   the inner tube has a plurality of depressions and protrusions formed axially and arranged alternately in the circumferential direction on an edge of an opening at one end;
   the top surface of the housing has a columnar protrusion protruding outward; and
   the opening of the inner tube having the depressions and protrusions is fitted into the columnar protrusion of the top surface of the housing, and the depressions of the inner tube are closed by an inner circumferential surface of the columnar protrusion.

* * * * *